United States Patent
Yuan et al.

(10) Patent No.: US 10,057,591 B2
(45) Date of Patent: Aug. 21, 2018

(54) METHOD AND DEVICE FOR PROCESSING A VIDEO STREAM IN A VIDEO CAMERA

(71) Applicant: Axis AB, Lund (SE)

(72) Inventors: Song Yuan, Sodra Sandby (SE); Alexandre Martins, Malmo (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 15/135,989

(22) Filed: Apr. 22, 2016

(65) Prior Publication Data
US 2016/0316219 A1    Oct. 27, 2016

(30) Foreign Application Priority Data
Apr. 23, 2015    (EP) .................................... 15164848

(51) Int. Cl.
| | |
|---|---|
| *H04N 19/46* | (2014.01) |
| *H04N 21/435* | (2011.01) |
| *H04N 21/84* | (2011.01) |
| *H04N 19/115* | (2014.01) |
| *H04N 19/137* | (2014.01) |
| *H04N 19/167* | (2014.01) |
| *H04N 19/176* | (2014.01) |

(Continued)

(52) U.S. Cl.
CPC ........... *H04N 19/46* (2014.11); *H04N 19/115* (2014.11); *H04N 19/137* (2014.11); *H04N 19/167* (2014.11); *H04N 19/176* (2014.11); *H04N 19/186* (2014.11); *H04N 19/85* (2014.11); *H04N 21/435* (2013.01); *H04N 21/84* (2013.01)

(58) Field of Classification Search
CPC ...... H04N 19/46; H04N 19/137; H04N 19/85; H04N 19/115; H04N 19/167; H04N 19/186; H04N 19/176; H04N 21/435; H04N 21/84
See application file for complete search history.

(56) References Cited

U.S. PATENT DOCUMENTS

| | | |
|---|---|---|
| 6,538,676 B1 | 3/2003 | Peters |
| 6,833,865 B1 | 12/2004 | Fuller et al. |
| 8,355,570 B2 | 1/2013 | Karsanbhai et al. |

(Continued)

FOREIGN PATENT DOCUMENTS

| | | |
|---|---|---|
| CN | 101187932 A | 5/2008 |
| CN | 102893602 A | 1/2013 |

(Continued)

OTHER PUBLICATIONS

Extended European Search Report dated Jun. 29, 2015 in European Application 15164848.2, filed Apr. 23, 2015 (with Written Opinion).

(Continued)

*Primary Examiner* — Padma Haliyur
(74) *Attorney, Agent, or Firm* — Oblon, McClelland, Maier & Neustadt, L.L.P.

(57) ABSTRACT

A method for processing an image in a video device, comprises reading an image and combining the image with metadata related to the image by embedding the metadata in or with the image. The method further includes combining transforming the image and extracting the metadata from the image, before encoding the image in an encoder and utilizing the metadata as input in further processing.

17 Claims, 2 Drawing Sheets

(51) Int. Cl.
    *H04N 19/186*     (2014.01)
    *H04N 19/85*     (2014.01)

(56) References Cited

U.S. PATENT DOCUMENTS

| | | | |
|---|---|---|---|
| 8,811,708 B2* | 8/2014 | Fischer | G06T 7/0012 |
| | | | 382/128 |
| 2003/0098881 A1 | 5/2003 | Nolte et al. | |
| 2005/0033760 A1 | 2/2005 | Fuller et al. | |
| 2008/0123897 A1 | 5/2008 | Cho | |
| 2012/0321273 A1 | 12/2012 | Messmer | |
| 2015/0071615 A1 | 3/2015 | Messmer | |
| 2016/0007037 A1* | 1/2016 | Zhao | H04N 19/45 |
| | | | 382/233 |

FOREIGN PATENT DOCUMENTS

| | | |
|---|---|---|
| JP | 2007-505590 A | 3/2007 |
| WO | 2006/025339 A1 | 3/2006 |

OTHER PUBLICATIONS

"JPEG", Wikipedia, URL: https://en.wikipedia.org/w/index.php?title=JPEG&Oldid=654753284[2016-03-22 14:31:18].
"Raster Graphics" Wikipedia, URL: https://en.wikipedia.org/w/index.php?title=Raster_graphics&direction=next&oldid=655719931[2016-03-22 14:30:09].
"Image File Formats", Wikipedia, URL: https://en.wikipedia.org/wiki/image_file_formats[2016-03-22 14:25:02].
Notice of Reasons for Rejection issued in corresponding Japanese Application No. 2016-080271 dated Apr. 17, 2018.

* cited by examiner

METHOD AND DEVICE FOR PROCESSING A VIDEO STREAM IN A VIDEO CAMERA

TECHNICAL FIELD

The present invention relates to a method for processing a video stream, in particular a video stream within a video camera.

BACKGROUND

In a video camera an image sensor is used to acquire an image as acquired via imaging optics of the video camera. The image sensor is typically a matrix of pixels sensitive to radiation, typically in the form of light.

The raw image as read from the image sensor is usually not fit for direct display, and there are several reasons for this, so the image is subjected to substantial processing before it is forwarded for display. The general purpose of the video camera is to acquire an image and to prepare the image for viewing. In a video camera as used herein the camera is mostly used for monitoring operations, such as surveillance. In such a camera the image leaves the camera as one frame in a video stream, and as such the camera will include an encoder preparing and forwarding the video stream.

The processing steps may include operations performed on the image as such, e.g. demosaicing, balancing intensities, balancing colors, correcting for image distortions, and furthermore the image may be resized, rotated and finally processed in the encoder. The mentioned steps are examples only, and not given in any particular order.

When processing the image use may be made of metadata, e.g. data deduced from the raw image. Just to give a few relevant examples, the metadata may concern:

The signal to noise ratio (SNR) for various portions of the image. SNR data may be used to configure or change filters inside the camera, such as noise filtering, and it may also be used to trigger external lights for improvement of light conditions.

Identification of regions where motion has been detected are typically identified if the video camera is used for monitoring or surveillance purposes, where a change in the image typically identifies an event of interest.

Identification or preset regions of interest (ROI) of particular interest for the image processing (or identified by a user as being particularly interesting), such as a face, a particular shape etc.

A final example of this type of metadata relates to a compression map for the image. A compression map may be a table provided to an encoder to change its compression parameters spatially, and it could relate to a compression level, a table with constants and thresholds or constants for block type decisions. By comparing the image to previous images a map indicating how the image may be encoded according to a particular protocol may be generated.

The above examples of metadata may be extracted from the raw image as it has been read from the image sensor, and is usable for downstream processes.

Metadata does not have to comprise information extracted from the image to be considered as metadata in the context of the present disclosure. An example of this type of metadata may be related to various masks used for correction or adjustment of the image at a later stage in the image processing. Another example may be related to a region of interest preset by a user. The metadata may also relate to user-defined regions of interest, privacy masks, priority regions (a map of where image quality should be prioritized if needed), and information relating to settings of the camera or input from sensors; zoom level, shutter speed, tilt sensors.

The imaging optics of a video camera will most often introduce a certain degree of distortion to the image. Some common examples are barrel distortion and pincushion distortion. Other types of distortion may include chromatic aberration, monochromatic aberration, and related subgroups.

The distortions will imply that the image as read from the image sensor is not fit for display in its present form; there may be a need for a transformation prior to displaying the image.

The image processing described may be performed in and encoder, transcoder or in a video management system, to mention a few alternatives to a video camera, i.e. the processing may be the same or similar irrespective of whether the image is read from an image sensor or provided from a file.

SUMMARY OF THE INVENTION

In an effort to simplify processing of images, in particular when the processing includes transformation of an image the present application discloses a method for processing an image in a video device. The method comprises a series of steps which may or may not be performed in the order listed and including reading an image, combining the image with metadata related to the image by embedding the metadata in or with the image, transforming the image, extracting the metadata from the image, encoding the image in an encoder, and utilizing the metadata as input in further processing.

The method is particularly advantageous when the metadata is embedded with or in the image prior to transformation, since metadata relating to a particular region (pixel, block of pixels etc) of the image will follow that region during transformation. A further effect is that the transformation will only have to be performed once for each set of metadata and image, rather than transforming them one after the other.

In one or more embodiments the further processing comprises processing of the image or processing of subsequent images, i.e. the metadata extracted from one image may be used for processing of that particular image, e.g. during encoding of the same, but the metadata may also be used in processing of subsequent images, e.g. by altering the settings as a result of a particular signal to noise ratio in a particular region of the image.

In other or related embodiments the processing may comprise processing of the metadata as such, in isolation from the image. The processing may include evaluation of SNR-metadata, motion metadata, object identification metadata, etc. SNR-metadata may be used to avoid errors in edge detection, and motion metadata may be used in order to support an analytics section in performing motion detection, just to mention a few different use-cases.

In related or separate embodiments the further processing may comprise processes such as image analysis, vision applications, rate control or frame stitching. These processes may obviously be performed in isolation or in combination. Image analysis is meant to include processes for analyzing the image for object, motion or other basic information, e.g. motion detection, object detection, face detection etc. Vision applications envisage processing of the image in order to understand it; to mimic human vision and cognitive methods, and examples include object identification, face identification, people counting, etc.

The result or the basis of such processing may be derived from an image or a sequence of images in the form of metadata, and the metadata may be used in isolation and/or for support for other processes.

In one or several embodiments the metadata embedded in or with the image has been derived from the image, i.e. the image has been analyzed using various algorithms to arrive at various types of metadata. This will be illustrated further in the detailed description. In situations where the method is used in a video camera this embodiment would be applicable more often than not. The raw image is evaluated using different algorithms and the result may be in the form of metadata. This metadata may then be embedded with or in the image for convenience.

In one or more embodiments converting the image from a raster format to a block format is performed prior to transforming the image, and wherein converting the image back from a block format to a raster format is performed prior to processing the image using the metadata as input.

In one or several embodiments the method comprises combining the image with metadata prior to, and/or following transforming the image, wherein the metadata is in the form of overlays. Several of the advantages stated in relation to the present invention are coupled to the embedding of metadata prior to performing transformation, yet there may be situations where metadata is added following the transformation only or as well.

In one or more embodiments the metadata is embedded with the image by embedding the metadata as an additional color space component to a corresponding pixel block.

In one or more other embodiments the metadata is embedded with the image by padding a color space component of a specific pixel block with the metadata corresponding to the specific pixel block.

In still other embodiments the metadata is embedded in the image by replacing a portion of the color or luminance information in the image.

In embodiments where the image is a block formatted image, metadata may be appended to every macroblock in the block formatted image.

In one or several embodiments the metadata is separated from the image prior to forwarding the image to the encoder, rather than merely being extracted. If a standard encoder is used there may be an advantage in removing the metadata prior to sending it to an encoder, since the presence of metadata embedded in the image may cause malfunction or conflicts in the encoder.

In one or more embodiments the metadata may be selected from the group comprising: signal to noise metadata, compression metadata, motion metadata, privacy mask metadata and region of interest metadata, and combinations thereof.

In any of the embodiments, or additional embodiments, the video device may be a video camera, an encoder, a transcoder, or a component in a video management system (VMS).

According to another aspect the present invention relates to a video device configured to perform the method of one or more of the preceding or following embodiments. The video device may comprise: an image processing pipeline configured to extract metadata from an image, and further being configured to embedding said metadata or other metadata into the image; a transformer, configured to receive the image with embedded metadata, and to transform the image with the embedded metadata according to defined settings; an extractor, configured to extract the metadata from the transformed image with the metadata, and to forward the image, such as an image encoder, configured to compress the image according to a particular protocol.

In one or more embodiments at least a selected portion of the metadata is also forwarded to further processing, and the selected portions are is used as input when compressing the image.

Further features of a video device of various embodiments of the present invention will not be discussed in isolation. Instead, further embodiments of the video device may be deduced from corresponding embodiments of the method, and the effects of these features may be deduced from the effects of the corresponding method as well. As an example, the video device may be a video camera, a video encoder, a video transcoder or a component in a VMS.

DETAILED DESCRIPTION OF EMBODIMENTS

Figure 1:
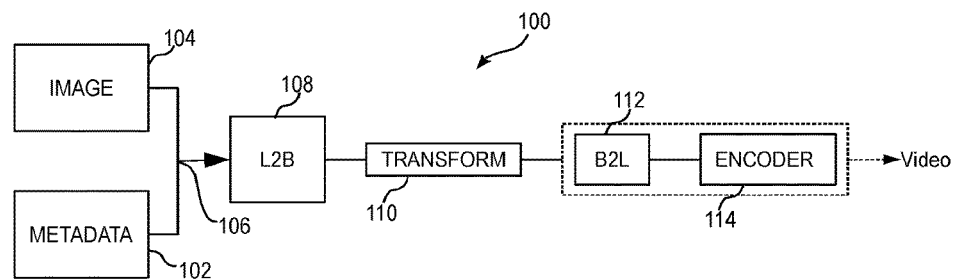
FIG. 1 is a block diagram illustrating a first embodiment of the present invention.

FIG. 1 illustrates a method according to first embodiment 100 of the present invention.

Before describing the details of FIG. 1 it is worthwhile to mention a few examples of what could be included in the definition of metadata in the context of the present description. First of all, the metadata of interest is metadata that has some correlation with different areas of the image. It could be on the level of a single pixel up to differently sized blocks of pixels. Within that narrowing of the broad definition examples include statistics or other data describing properties of images, such as color, regions of interest, motions, etc., adding to or included in the examples given in the background section. An analytics unit of an image processor incorporated in the video camera may detect a motion in a particular portion of the image, or a storage portion may incorporate a mask concerning how the intensity of various portions of the image should be balanced in order to account for irregularities of the image sensor. Furthermore the metadata may track how intensities have changed in the image in relation to a previous image, and how various portions of the image have moved, and by that the metadata will define how various portions of the image have behaved and how the image should be encoded in the stream of images. The metadata could also concern a signal to noise ratio for various portions or the image, a contrast for various portions of the image, an intensity histogram for various portions of the image, etc. Apart from that the metadata should have an impact on the level of individual pixels or group of pixels, the metadata should preferably be intended to be used by a downstream process, such as by an encoder, which is the case today.

Returning to the block diagram of FIG. 1, metadata 102 is combined with a raw image 104, in that the metadata is embedded 106 into the image.

The actual embedment may be performed in one of many ways. A first example could include padding the metadata into the existing color space. Typically the U/V component may be one byte, and while a reduction to 6 or 7 bits may be acceptable if it would not deteriorate the image quality to a higher extent. Then metadata could then be added to the now available 2 or 1 bits. As this solution is purely internal within the camera it is possible to select the best way for the particular application. A second example could be to extend the color space component by adding a byte of metadata. As an example the U/C component may be 1 byte long but an extra byte for the metadata is added to each UN component instead making it 2 bytes long.

Some further specific examples of how the combination of image and metadata may be performed may include:

For YUV422, having 1×Y byte per pixel and 1×byte per 2×1 pixel block for both U and V=UYVY, one more byte of metadata may be added to the UYVY format making it UYVYM, where M represents the metadata added For YUV420, having 1×Y byte per pixel and 1×byte per 2×2 pixel block for both U and V=YYYYUV, one more byte of metadata may be added for each 2×2 block making it YYYYUVM, again M representing the metadata added); or For NV12 metadata may be saved in a separate plane. A third plane for metadata may be added in addition to the two Y and UV planes already present for NV12.

The metadata may also be padded as one or more bits into the Y, U or V color space components.

There are several more ways of embedding the metadata into an image, and the very specific examples above should thus not be construed as limiting for the present invention as defined by the claims. The above examples mainly relates to situations where the metadata is embedded with an image. Another category would be that the metadata is embedded in an image, i.e. that portions of e.g. color information or luminance information is removed and replaced by metadata. Some image information may be lost, yet the metadata may not necessarily have to be removed before sending the image to a standard encoder, and this will be discussed in reference to the encoder.

Metadata as such could be embedded with or in the image as exemplified. If the metadata is too extensive, or if it is suitable for other reasons, the metadata could be replaced by pointers. The effect and means for embedding the pointers to the metadata is fully analogous to embedding the metadata as such, and the pointers will be associated with the pixel, block of pixels or regions in the same manner as the metadata would be. For that reason the pointers to metadata will be contained in the wider definition "metadata" for the purpose of the present description. Each pointer points to a positon in a memory space where the actual metadata is located.

The list of examples is not meant to be exhaustive, rather it is meant to illustrate that there are several options for effecting the combination of image and metadata, and the selection of method may depend on the context.

Following the combination of data the image is converted 108 from line format, also referred to as raster format, to block format. This conversion is not required for all embodiments, since some transformations (e.g. dewarping) may require block data, while several other cases may operate directly on a raster image. In the present embodiment the metadata is added per block, and therefore the translation makes sense. In fact, it would be possible to use per-block metadata to a raster image, but such a process is unnecessarily cumbersome.

The image, now including the embedded metadata may be transformed 110 in various ways following the combination. Typical transformations include dewarping; including correcting the image for optical distortions such as barrel distortion, as well as other image distortions; and rotation, where the image is arranged correctly in relation to a particular reference system. Another example is image stabilization, where pixel information may be shifted around to account for uncontrolled motion during image acquisition. The result of any transformation may be that individual pixels or blocks of pixels are being shifted around in the image.

After the transformation 110, though not necessarily immediately after, the image is forwarded to an encoder 114, and prior to the encoder it may be preferable to extract (and remove) the metadata from the image, for reasons to be explained. In the encoder 114 the image is encoded and forwarded as a frame in a video stream, or as a separate compressed image. Prior to extracting the metadata and encoding the image data the combined image is translated back 112 from block format to line format. The encoding as such may be performed according to one of many existing encoding techniques, and since the encoding as such is not the core of the present invention it may include a future encoding technique as well. In the encoding the metadata or at least a portion thereof is used. Due to the fact that the metadata is embedded in or with the image the metadata will move as the pixels or blocks of pixels move in a transformation step. This means that the metadata may be readily extracted and coupled to the correct portion of the image, since the coupling to the correction portion of the image is maintained throughout the process. The extraction of the metadata may preferably be effected before entering the actual encoder, and the reason is practical in the sense that it allows for any standard encoder to be used. Apart from the aspect that it may be reasons to extract the metadata before entering the encoder, extraction of the metadata inside the encoder is by no means impossible or even difficult, and should therefore not be excluded from the scope of the present invention as defined by the appended claims.

When the metadata is embedded in the image, i.e. when metadata replaces portions of e.g. the color information, the information as such may still be extracted from the image but there may be no need of removing the metadata from the image prior to sending it into the encoder. The encoder would not realize that it was there, and though it may affect the appearance of the image the effect may be negligible. The effect could be that the metadata is contained in the image throughout the entire process and beyond.

Figure 2:
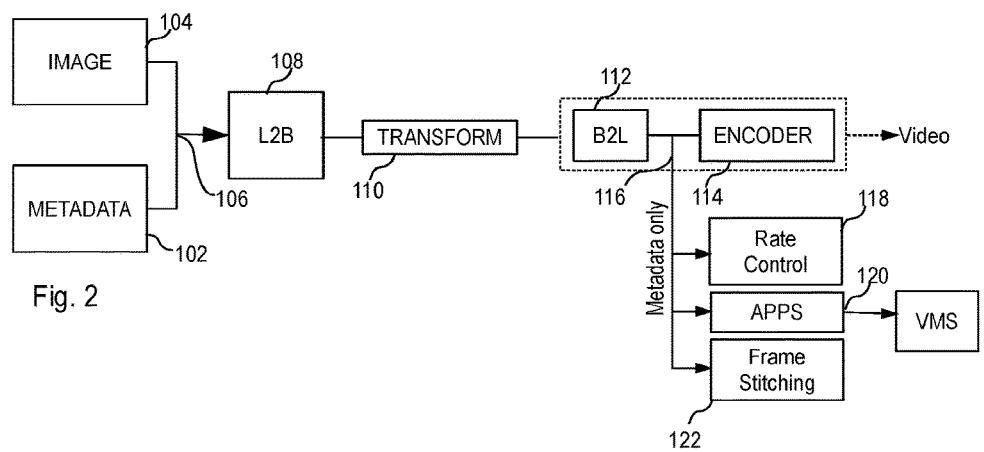
FIG. 2 is a block diagram illustrating a second embodiment of the present invention.

The metadata of main interest for the encoder may be the compression metadata, or the compression map, yet a further effect of the present disclosure is that there will be a collection of metadata perfectly matched to the image sent out from the encoder, i.e. the image that will be shown to a user or be processed further at a client. This means that the metadata or a selected portion thereof may be forwarded to a downstream process. The downstream process may be a process within the constraints of the video camera, yet it may also be externally thereof. This is further illustrated in FIG. 2 and relates to a second embodiment. FIG. 2 may actually be said to include a series of embodiments having in common that the extracted metadata is used in a process other than the encoding, as indicated at 116 in FIG. 2. In one embodiment the metadata is forwarded to a rate control 118. In another embodiment the metadata may be forwarded to an external application 120 and to a VMS (Video Management System) and/or to an internal application. In yet another embodiment the metadata is forwarded to a frame stitching process 122, e.g. where four different views (one from each of four video cameras) are combined into a single view which is shown to an operator. Any of these embodiments may be freely combined. Other examples could include an edge detection algorithm that uses the SNR per region to avoid false positives, i.e. reduce the risk of detection of edges that are actually not edges. In another example the result of a motion detection algorithm is embedded as metadata in or with the image, wherein the result could be sent to a borderline detection algorithm to anticipate crossing protected areas.

Figure 3:
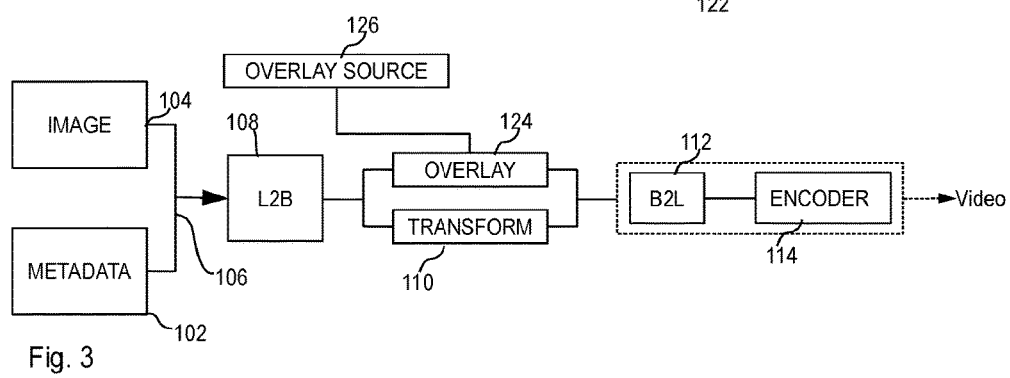
FIG. 3 is a block diagram illustrating a third embodiment of the present invention.

In a third embodiment as illustrated in FIG. 3 there is an additional step of adding an overlay 124 prior to or after the step of transforming the image, and this overlay may be considered as further metadata being combined with the image. The overlay may be a privacy mask or a text layer adding text information to the image for the benefit of a user, and depending on the type it may be embedded in the image before or after transformation of the same, a text layer would generally not be added until after the transformation since it may not be connected to particular pixels or regions, while a privacy mask may be added before or after the transformation depending on the type of mask. If privacy masks are applied dynamically the algorithms identifying the regions to be masked may utilize a non-transformed image.

It should be pointed out that the embodiments disclosed this far may be freely combined for generating further embodiments, e.g. the addition of an overlay source as used in the third embodiment illustrated in FIG. 3 may be added to the second embodiment illustrated in FIG. 2, which would generate a fourth embodiment.

Figure 4:
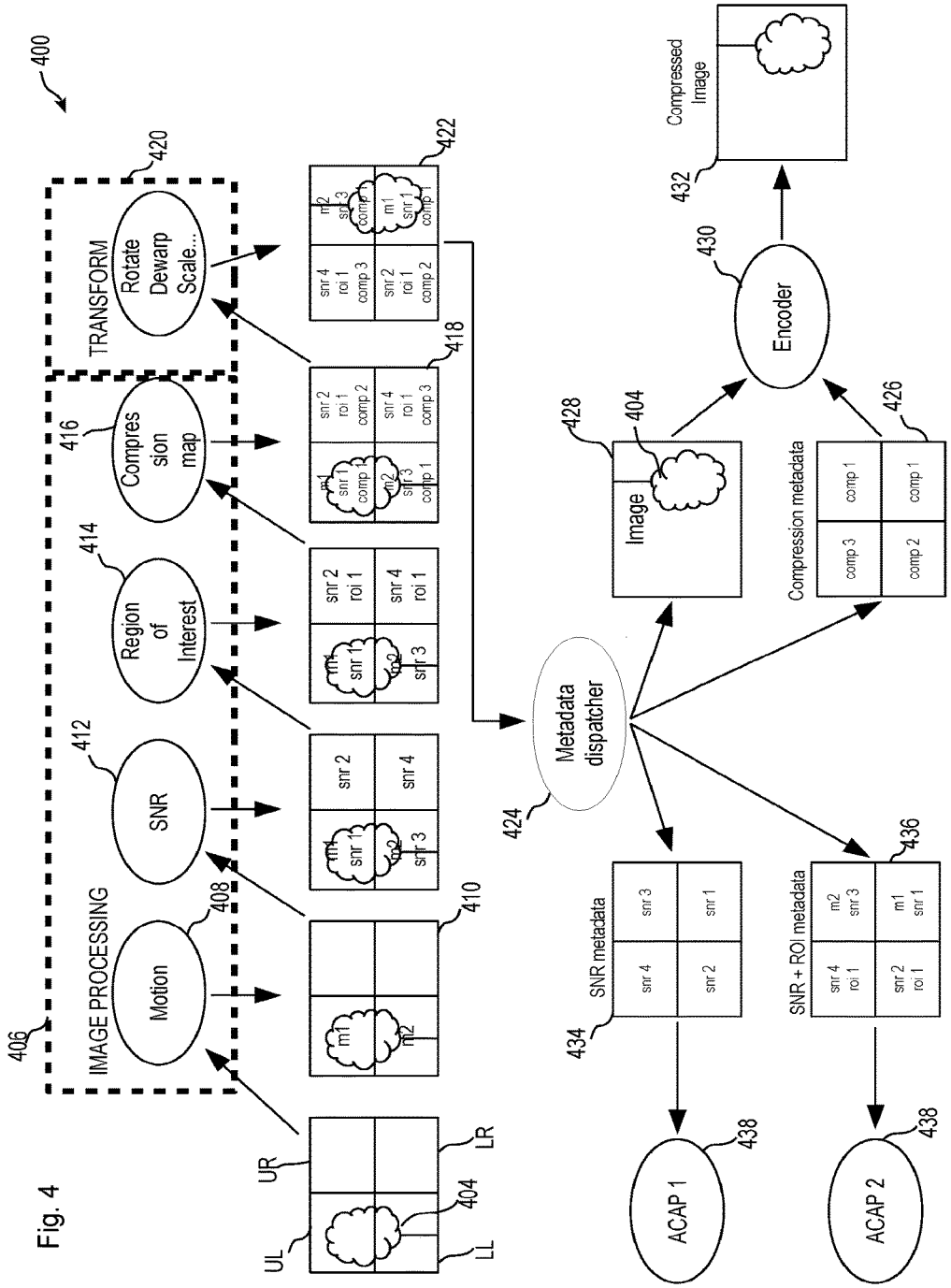
FIG. 4 is a functional chart illustrating a fourth embodiment of the present invention.

Following the schematic introduction of FIGS. 1-3, FIG. 4 illustrates some more detailed applications of the present invention. FIG. 4 is a functional chart of image processing according to a fourth embodiment of the present invention. The embodiments as such includes several features already disclosed, and it may also be divided into multiple embodiments accordingly. The purpose of FIG. 4 is to describe aspects of the invention slightly differently from FIGS. 1-3 and to thereby increase the understanding of the present invention.

In a first step an image is acquired. The image as such may be acquired from an image sensor, yet it may as well be read from a file or acquired from another image source. In the present embodiment a tree is imaged. The image is divided into four sectors in this simplified layout; an upper left (UL), an upper right (UR), a lower left (LL) and a lower right (LR).

The image then enters an image processing pipeline 406, and in a first step 408 the motion in each sector may be detected, in the present example a motion m1 is detected in the upper left sector and a motion m2 is detected in the lower left sector as indicated in the output image at 410. No motion was detected in the other sectors in the present example.

In a second step 412 a signal to noise ratio may be calculated for each sector resulting in the values snr1-snr4 counting from the upper left to the lower right sector of the image, each indicating the SNR level for the particular sector.

Following the deduction of signal-to-noise ratios a step of identifying regions of interest 414 and a compression map 416 may be performed, and the corresponding metadata is embedded into the image 418.

After the image processing pipeline the outcome is the raw image with embedded metadata and for each sector of the image 418 the result is the following:
UL: m1, snr1, comp1,
UR: snr1, roi1, comp1
LL: m2, snr3, comp1
LR: snr4, roi1, comp3

As the combined image now enters the transformation step 420 the advantages of the present invention becomes obvious. In the present embodiment the transformation corresponds to a 180-degree rotation of the image, and as the image is rotated the embedded metadata will be rotated as well. For the metadata this corresponds to being moved two sectors in the clockwise (or anti-clockwise for that matter) but it is apparent that regardless of the transformation the embedded metadata would follow the corresponding image data, as indicated in the output image 422.

Following the transformation the metadata may be separated from and dispatched 424 from the image; and metadata relating to the compression map 426 may be forwarded with the transformed image 428 to the encoder 430, from which the outcome is a compressed image 432. Other types of metadata, such as the metadata related to signal to noise ratio 434, possibly combined with metadata related to regions of interest 436, may be forwarded to other applications, for example applications available at application platforms, 438.

In the present example the image was divided into four sectors, which should be considered as a non-limiting example having an explanatory purpose only. In other embodiments the division may be closer to pixel size, such as 16×16-32×32 pixels, it could be divided into image blocks, such that each image would contain 32×32 sectors or 64×64 sectors, just to give some further examples. The sectors would not have to be symmetric in width and height, they could as well divide the image in slices etc.

The embodiment of FIG. 4 comprises a number of embodiments and alternatives. It may be divided into further embodiments by e.g. selecting a single image processing step from the flow of FIG. 4, such as step 408 or 412 or 416 etc. and omitting one or more of the others.

Further to what has been disclosed already in relation to the definition of metadata, it may be highlighted that the metadata can relate to the actual data (as for most of the examples herein) but also comprise an ID or pointer to a table of metadata without departing from the scope of the present invention as defined by the appended claims. Also, the metadata may be used at any stage during the image processing. A number of examples of metadata has been given in the description, and it should be emphasized that the list of metadata is not exhaustive. The present invention does not relate to new types of metadata but rather to a new manner of processing metadata in conjunction with images in an image processing pipeline, as defined by the claims. Further to this aspect. In the examples of the description the image has thus far been acquired from a sensor, yet the inventive method may be equally advantageous if the image is read from a file or from another input source. Such image may of course have been acquired from a sensor at some point, yet the present invention should not be limited in that respect.

The method as such, and embodiments thereof, could be used in isolation as a part in an encoding sequence or a transcoding sequence, and the term "video device" is used as a general term comprising but not limited to the exemplified devices, i.e. a video camera, a video encoding device, a video transcoding device, and a Video Management System.

The invention claimed is:
1. A method for processing an image in a video device, the method comprising:
reading an image;
combining the image with metadata related to the image by embedding the metadata into the image, wherein the image includes a plurality of blocks of pixels, each block of pixels includes a plurality of pixels, and
the metadata is embedded into the image such that particular metadata, corresponding to a particular block of pixels of the plurality of blocks of pixels, is embedded in the particular block of pixels;

dewarping the image with the embedded metadata to generate a dewarped image;

extracting the metadata from the dewarped image to generate a transformed image and forwarding the transformed image to an encoder;

encoding the transformed image in the encoder; and utilizing the metadata as input in further processing.

2. The method of claim 1, wherein the further processing comprises processing of the image or processing of subsequent images.

3. The method of claim 1, wherein the further processing comprises processing the metadata.

4. The method of claim 1, wherein the further processing comprises image analysis, vision applications, performing rate control, performing frame stitching, action triggering or supporting image analysis tools, and combinations thereof.

5. The method of claim 1, further comprising deriving the metadata from the image prior to embedding it into the image.

6. The method of claim 1, converting the image from a raster format to a block format is performed prior to transforming the image, and wherein converting the image back from a block format to a raster format is performed prior to processing the image using the metadata as input.

7. The method of claim 1, comprising combining the image with metadata prior to, and/or following transforming the image, wherein the metadata is in the form of overlays.

8. The method of claim 1, wherein metadata is combined with the image by embedding the metadata as an additional color space component to a corresponding pixel block.

9. The method of claim 1, wherein the metadata is combined with the image by padding a color space component of a specific pixel block with the metadata corresponding to the specific pixel block.

10. The method of claim 1, wherein the metadata replaces a portion of the color or luminance information in the image.

11. The method of claim 1, wherein the metadata is appended to every macro block in a block formatted image.

12. The method of claim 1, wherein the metadata is selected from the group comprising: signal to noise metadata, compression metadata, motion metadata, privacy mask metadata and region of interest metadata, and combinations thereof.

13. The method of claim 1, wherein the video device is a video camera, a video encoder, a video transcoder, or a video management system.

14. A video device arranged to perform the method of claim 1, said video device comprising:

an image processing pipeline configured to extract the metadata from the dewarped image, and further being configured to embed said metadata or other metadata into the image;

a transformer configured to receive the image with embedded metadata and to dewarp the image with the embedded metadata according to defined settings; and an extractor configured to extract the metadata from the dewarped image with the metadata, and to forward the transformed image to an image encoder configured to compress the image according to a particular protocol.

15. The video device of claim 14, wherein the video device is a video camera, a video encoder, a video transcoder, or a video management system.

16. An electronic device, comprising:
circuitry configured to
read an image;
combine the image with metadata related to the image by embedding the metadata into the image, wherein
the image includes a plurality of blocks of pixels,
each block of pixels includes a plurality of pixels, and
the metadata is embedded into the image such that particular metadata, corresponding to a particular block of pixels of the plurality of blocks of pixels, is embedded in the particular block of pixels;
dewarp the image with the embedded metadata to generate a dewarped image;
extract the metadata from the dewarped image to generate a transformed image; and
forward the transformed image to an encoder; and
the encoder configured to
encode the transformed image; and
utilize the metadata as input in further processing.

17. A method for processing an image in a video device, the method comprising:
reading an image;
combining the image with metadata related to the image by embedding the metadata into the image, wherein
the image includes a plurality of blocks of pixels,
each block of pixels includes a plurality of pixels, and
the metadata is embedded into the image such that particular metadata, corresponding to a particular block of pixels of the plurality of blocks of pixels and defining movement of the particular block of pixels, is embedded in the particular block of pixels;
spatially transforming the image with the embedded metadata;
extracting the metadata from the image and forwarding the image to an encoder;
encoding the image in the encoder; and
utilizing the metadata as input in further processing.

* * * * *